US011500671B2

(12) United States Patent
Duesterwald et al.

(10) Patent No.: US 11,500,671 B2
(45) Date of Patent: Nov. 15, 2022

(54) SYSTEM FOR OPERATIONALIZING HIGH-LEVEL MACHINE LEARNING TRAINING ENHANCEMENTS FROM LOW-LEVEL PRIMITIVES

(71) Applicant: International Business Machines Corporation, Armonk, NY (US)

(72) Inventors: Evelyn Duesterwald, Millwood, NY (US); Anupama Murthi, Pleasantville, NY (US); Deepak Vijaykeerthy, Bangalore (IN); Vijay Arya, Bangalore (IN); Ganesh Venkataraman, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 727 days.

(21) Appl. No.: 16/510,534

(22) Filed: Jul. 12, 2019

(65) Prior Publication Data

US 2021/0011757 A1 Jan. 14, 2021

(51) Int. Cl.
*G06F 9/48* (2006.01)
*G06K 9/62* (2022.01)
*G06N 20/00* (2019.01)

(52) U.S. Cl.
CPC ......... *G06F 9/4843* (2013.01); *G06K 9/6256* (2013.01); *G06K 9/6262* (2013.01); *G06K 9/6267* (2013.01); *G06N 20/00* (2019.01)

(58) Field of Classification Search
CPC ........ G06N 20/00; G06N 3/08; G06F 9/4843; G06F 9/48; G06K 9/6256; G06K 9/6267; G06K 9/6262; G06K 9/62
See application file for complete search history.

(56) References Cited

U.S. PATENT DOCUMENTS 10,026,041 B2 * 7/2018 Narayanan .......... G06F 9/44526
2016/0350656 A1 * 12/2016 Visvanathan .......... G06Q 10/06
(Continued)

OTHER PUBLICATIONS

Bardenet et al., "Collaborative hyperparameter tuning," International Conference on Machine Learning, pp. 199-207. 2013.
(Continued)

*Primary Examiner* — Tuan H Nguyen
(74) *Attorney, Agent, or Firm* — Garg Law Firm, PLLC; Rakesh Garg; Peter Edwards

(57) ABSTRACT

In an embodiment, a method for inspecting and transforming a machine learning model includes receiving a request that includes the machine learning model and a configuration object that provides an indication of a selected strategy. In the embodiment, the method includes creating a partially specified task graph that includes a first placeholder node for a future expanded task node. In the embodiment, the method includes performing a dynamic expansion and execution phase that includes, repeatedly (a) using a cognitive engine to evaluate whether to revise the partially specified task graph based at least in part on the selected strategy, and (b) using a processor-based execution engine to perform an action specified by the complete node. In an embodiment, the dynamic expansion and execution phase repeats until after the cognitive engine adds a consolidated results node.

20 Claims, 9 Drawing Sheets

(56) References Cited

U.S. PATENT DOCUMENTS

2018/0150728 A1     5/2018   Vahdat
2018/0300589 A1   10/2018  Levinshtein et al.

OTHER PUBLICATIONS

Olson et al., "Identifying and Harnessing the Building Blocks of Machine Learning Pipelines for Sensible Initialization of a Data Science Automation Tool," arXiv preprint arXiv:1607.08878 (2016).
Pinto et al., "Robust adversarial reinforcement learning," arXiv preprint arXiv:1703.02702 (2017).
Papernot et al., "cleverhans v2. 0.0: an adversarial machine learning library," arXiv preprint arXiv:1610.00768.
Chakraborty et al., Adversarial Attacks and Defences: A Survey, arXiv:1810.00069v1, Sep. 28, 2018.
Nicolae et al., Adversarial Robustness Toolbox v0.4.0, arXiv:1807.01069v3, Jan. 11, 2019.
Goodfellow et al., CleverHans Documentation, Jun. 12, 2019.
Bergstra et al., Algorithms for Hyper-Parameter Optimization, National Science and Engineering Research Council of Canada, Compute Canada, and by the ANR-2010-COSI-002 grant of the French National Research Agency.
Airflow Apache, Apache Airflow Documentation, https://airflow.apache.org, 2019.
IBM Cloud, Getting started tutorial, Jun. 5, 2019, https://cloud.ibm.com/docs/openwhisk?topic=cloud-functions-getting-started.

* cited by examiner

SYSTEM FOR OPERATIONALIZING HIGH-LEVEL MACHINE LEARNING TRAINING ENHANCEMENTS FROM LOW-LEVEL PRIMITIVES

TECHNICAL FIELD

The present invention relates generally to machine learning. More particularly, the present invention relates to training enhancement in deep learning systems.

SUMMARY

The illustrative embodiments provide a method, system, and computer program product for enhancing machine learning models. In an embodiment, the method includes receiving, by one or more processors, a request that includes the machine learning model and a configuration object, wherein the configuration object provides an indication of a selected enhancement strategy. In an embodiment, the method includes creating, by one or more processors, a partially specified task graph based on the selected strategy, wherein the partially specified task graph includes a first placeholder node for a future expanded task node.

In an embodiment, the method includes performing, by one or more processors, a dynamic expansion and execution phase that includes, repeatedly (1) using a cognitive engine to evaluate whether to revise the partially specified task graph based at least in part on the selected strategy if at least one placeholder node is present in the partially specified task graph, using a cognitive engine to evaluate whether to revise the partially specified task graph based at least in part on the selected strategy, and (2) using a processor-based execution engine to perform an action specified by the complete node if the cognitive engine adds a complete node to the specified graph, using a processor-based execution engine to perform an action specified by the complete node. In an embodiment, the method includes the dynamic expansion and execution phase repeating until after the cognitive engine adds a consolidated results node.

In an embodiment, the method includes receiving, via a graphical user interface (GUI) generated by one or more processors, user input data indicative of the selected strategy, the selected strategy corresponding to a displayed strategy option. In an embodiment, the method includes retrieving, from a computer-readable storage device by one or more processors, an algorithm library associated with the selected strategy.

In an embodiment, the method includes creating, by one or more processors, the configuration object based at least in part on the selected strategy and the algorithm library associated therewith. In an embodiment, the method includes creating, by the one or more processors, of the partially specified task graph includes initializing the partially specified task graph to include a number of nodes, wherein the number of nodes is based on the algorithm library associated with the selected strategy.

In an embodiment, the method includes the dynamic expansion and execution phase further comprising storing, by one or more processors in a computer-readable memory, historical data representative of a result of an action previously performed by the execution engine as specified by a previous node of the partially specified task graph. In an embodiment, the method includes the cognitive engine evaluating whether to revise the partially specified task graph based at least in part on the historical data and based on the configuration object.

In an embodiment, the method includes the cognitive engine revising the partially specified task graph based on a revised hyperparameter. In an embodiment, the method includes the cognitive engine evaluating how to revise the partially specified task graph by querying a composition planning module to determine a next step in a composition plan for executing the request. In an embodiment, the method includes the cognitive engine revising the partially specified task graph according to a selected strategy for improving a robustness of the machine learning model. In an embodiment, the method includes that the performing of the dynamic and execution phase includes a plurality of iterations of the using of the execution engine to perform respective actions, wherein the respective actions collectively modify the machine learning module and thereby repair model revisions previously made by malicious training data.

An embodiment includes a computer usable program product for inspecting and transforming a machine learning model. The computer usable program product comprising a computer-readable storage device, and program instructions stored on the storage device.

In an embodiment, the stored program instructions comprise program instructions to receive, by one or more processors, a request that includes the machine learning model and a configuration object, wherein the configuration object provides an indication of a selected strategy. In an embodiment, the stored program instructions comprise program instructions to create, by one or more processors, a partially specified task graph based on the selected strategy, wherein the partially specified task graph includes a first placeholder node for a future expanded task node.

In an embodiment, the stored program instructions comprise program instructions to perform, by one or more processors, a dynamic expansion and execution phase that includes, repeatedly (1) using a cognitive engine to evaluate whether to revise the partially specified task graph based at least in part on the selected strategy if at least one placeholder node is present in the partially specified task graph, and (2) using a processor-based execution engine to perform an action specified by the complete node if the cognitive engine adds a complete node to the specified graph. In an embodiment, the dynamic expansion and execution phase repeats until after the cognitive engine adds a consolidated results node.

In an embodiment, the stored program instructions comprise program instructions to program instructions to receive, via a graphical user interface (GUI) generated by one or more processors, user input data indicative of the selected strategy, the selected strategy corresponding to a displayed strategy option.

In an embodiment, the stored program instructions comprise program instructions to retrieve, from a computer-readable storage device by one or more processors, an algorithm library associated with the selected strategy.

In an embodiment, the stored program instructions comprise program instructions to create, by one or more processors, the configuration object based at least in part on the selected strategy and the algorithm library associated therewith.

In an embodiment, the stored program instructions comprise program instructions to create, by the one or more processors, of the partially specified task graph includes initializing the partially specified task graph to include a number of nodes, wherein the number of nodes is based on the algorithm library associated with the selected strategy.

In an embodiment, the dynamic expansion and execution phase further comprises storing, by one or more processors in a computer-readable memory, historical data representative of a result of an action previously performed by the execution engine as specified by a previous node of the partially specified task graph.

An embodiment includes a computer system comprising a processor, a computer-readable memory, and a computer-readable storage device, and program instructions stored on the storage device for execution by the processor via the memory.

In an embodiment, the stored program instructions comprise program instructions to receive, by one or more processors, a request that includes the machine learning model and a configuration object, wherein the configuration object provides an indication of a selected strategy. In an embodiment, the stored program instructions comprise program instructions to create, by one or more processors, a partially specified task graph based on the selected strategy, wherein the partially specified task graph includes a first placeholder node for a future expanded task node.

In an embodiment, the stored program instructions comprise program instructions to perform, by one or more processors, a dynamic expansion and execution phase that includes, repeatedly (1) using a cognitive engine to evaluate whether to revise the partially specified task graph based at least in part on the selected strategy if at least one placeholder node is present in the partially specified task graph, and (2) using a processor-based execution engine to perform an action specified by the complete node if the cognitive engine adds a complete node to the specified graph. In an embodiment, the dynamic expansion and execution phase repeats until after the cognitive engine adds a consolidated results node.

In an embodiment, the stored program instructions comprise program instructions to program instructions to receive, via a graphical user interface (GUI) generated by one or more processors, user input data indicative of the selected strategy, the selected strategy corresponding to a displayed strategy option.

In an embodiment, the stored program instructions comprise program instructions to retrieve, from a computer-readable storage device by one or more processors, an algorithm library associated with the selected strategy.

In an embodiment, the stored program instructions comprise program instructions to create, by one or more processors, the configuration object based at least in part on the selected strategy and the algorithm library associated therewith.

In an embodiment, the stored program instructions comprise program instructions to create, by the one or more processors, of the partially specified task graph includes initializing the partially specified task graph to include a number of nodes, wherein the number of nodes is based on the algorithm library associated with the selected strategy.

In an embodiment, the dynamic expansion and execution phase further comprises storing, by one or more processors in a computer-readable memory, historical data representative of a result of an action previously performed by the execution engine as specified by a previous node of the partially specified task graph. In an embodiment, the stored program instructions comprise program instructions where the cognitive engine evaluates whether to revise the partially specified task graph based at least in part on the historical data and based on the configuration object.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
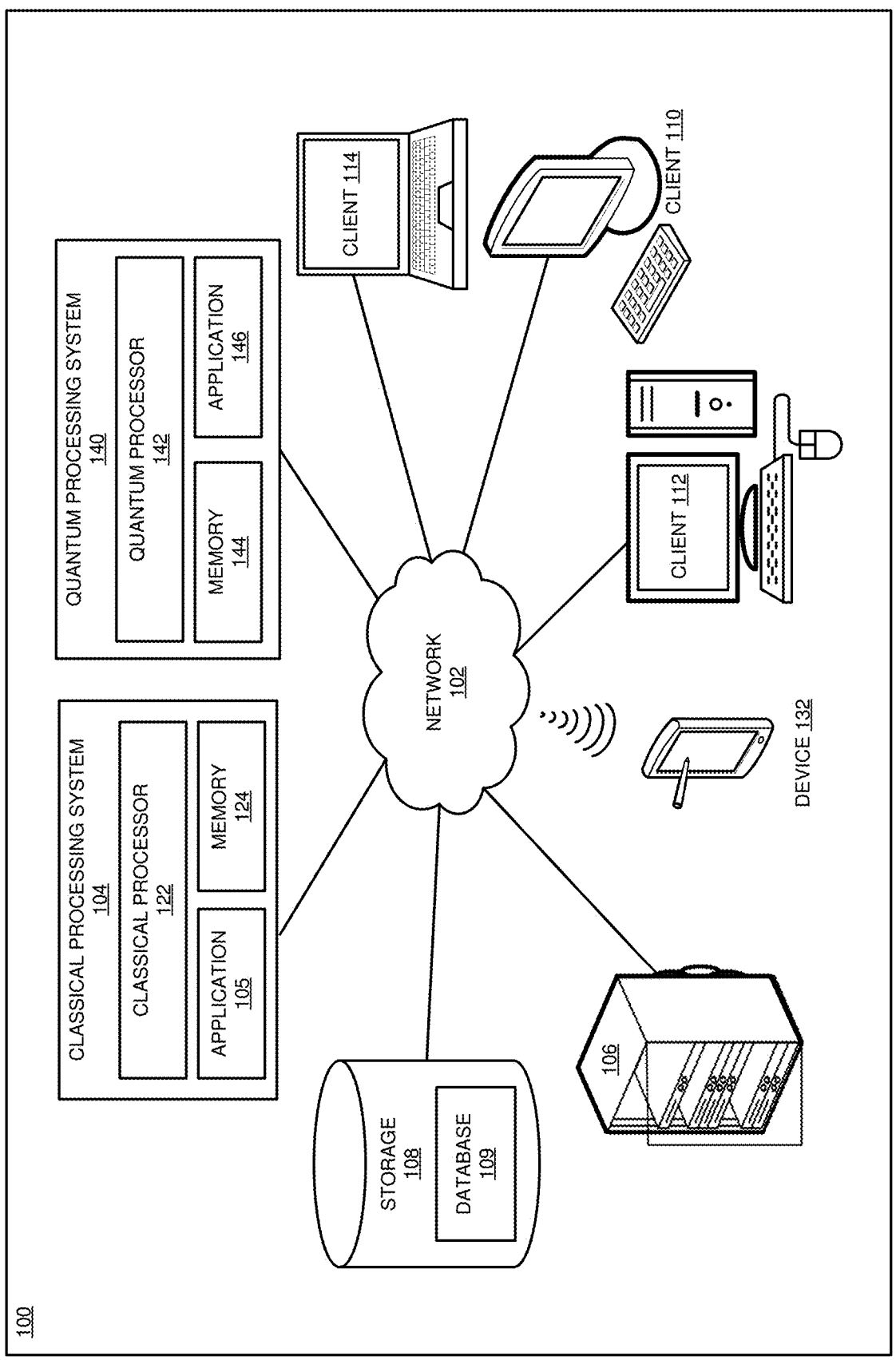
FIG. 1 depicts a block diagram of a network of data processing systems in which illustrative embodiments may be implemented.

Artificial intelligence (AI) technology has evolved significantly over the past few years. Many breakthroughs in AI are obtained using Artificial Machine learning models. Artificial Machine learning models are capable of dealing with high-dimensional inputs like photographs. But such learning models are susceptible to attack, specifically where an attacker can modify an input to produce an incorrect response. This poses a threat to the deployment of AI and security-critical applications.

This threat has led to the creation of a new field of research into how AI systems can be improved to mitigate these vulnerabilities. This research has produced methods of defending against adversarial attacks, such as: (1) Hardening models, (2) Measuring robustness and (3) Detecting adversarial inputs. Common approaches for model hardening include filtering the inputs, incorporating adversarial examples during training, or changing the internal architecture at the learning model such that the adversarial samples do not propagate through the internal hidden layers. The robustness of a learning model can be assessed by measuring the loss of accuracy on adversarial inputs. Other approaches quantify how much the internal representation and output of the learning models vary when small changes are applied to its input. Finally, run time detection methods can be applied to flag any inputs an adversary may have tampered with by identifying abnormal activations caused by the adversarial inputs.

Typically these enhancements are developed as low-level algorithms (library methods), often with many parameters. While numerous algorithms and research papers have been created and released into the open source, there is little to no uptake of these technologies in enterprise machine learning practice. Significant impediments to adoption of these new technologies are preventing more widespread adoption, such as:

1. Low-level algorithms and routines, such as adversarial examples generation, are difficult to understand and work with by AI engineers that are not experts on the topic.
2. Algorithms often have many parameters that need to be adjusted and tuned for any application at hand.
3. A practical training enhancement usually results as a combination of low-level techniques and constructing such combinations can be daunting for non-experts. For example, a robustness penetration test involves a series of adversarial example generation techniques or poison checks; a bias check involves a series of checks for specific biases, and compression involves a series of steps, that may be iterative.
4. Fast moving spaces. New algorithms are being developed all the time and it is difficult for the non-expert to keep up with the latest and know what to work with.
5. Integration: low-level algorithms are difficult to integrate into existing training or continuous integration pipelines
6. Several toolboxes are emerging that are open source, but the toolboxes contain low-level building blocks that are difficult to use for checking and defending a trained model from exploitation.
7. Any actual defense such as a model penetration test or model hardening results as a combination of techniques and each element in the combination usually needs custom configuration.

As a result, coming up with a specific defense strategy for a given model is a complex task that requires deep expertise. Therefore, there exists a need to improve the adoptability of new machine learning technologies that provide defenses against vulnerabilities in AI systems. The illustrative embodiments used to describe the invention generally address and solve the above-described problem of inspecting and transforming a machine learning model to achieve an enhanced version of the model and using the resulting enhanced model for a cognitive process that, as a result of the enhancement, demonstrates an improvement in the quality of the results. For example, in some embodiments, the enhanced model produced improved image recognition compared to before the enhancement of the model.

An embodiment provides a method for inspecting and transforming a machine learning model. Another embodiment provides a computer usable program product for inspecting and transforming a machine learning model, the computer usable program product comprising a computer-readable storage device, and program instructions stored on the storage device. Another embodiment provides a computer system comprising a processor, a computer-readable memory, and a computer-readable storage device, and program instructions stored on the storage device for execution by the processor via the memory.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing model enhancement, for example Robustness-as-a-Service, to operationalize the training enhancements. A goal is to make complex model enhancements accessible to non-experts. Instead of exposing low-level building blocks, there are instead exposed high-level strategies requiring significantly less expertise to work with. Pre-built strategies are offered that do not require users of robustness to combine and tune the individual building blocks in meaningful ways; instead, they provide a set of pre-built strategy templates to capture common robustness needs. Adaptive and auto-tuning strategies are provided to take the guesswork out of configuring the parameters of building blocks provide strategies that self-adapt and self-tune robustness parameters for the user. The technologies are available as-a-service for ease of integration and include a service request interface to simplify integration of robustness checking and hardening workflows, or other training enhancement workflows, into existing training or continuous integration pipelines. Transparent updates are made available because robustness is a fast-moving technology area. Making the upgrade to the latest technology in terms of hardening and robustness can be as easy as the push of a button to receive updates.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
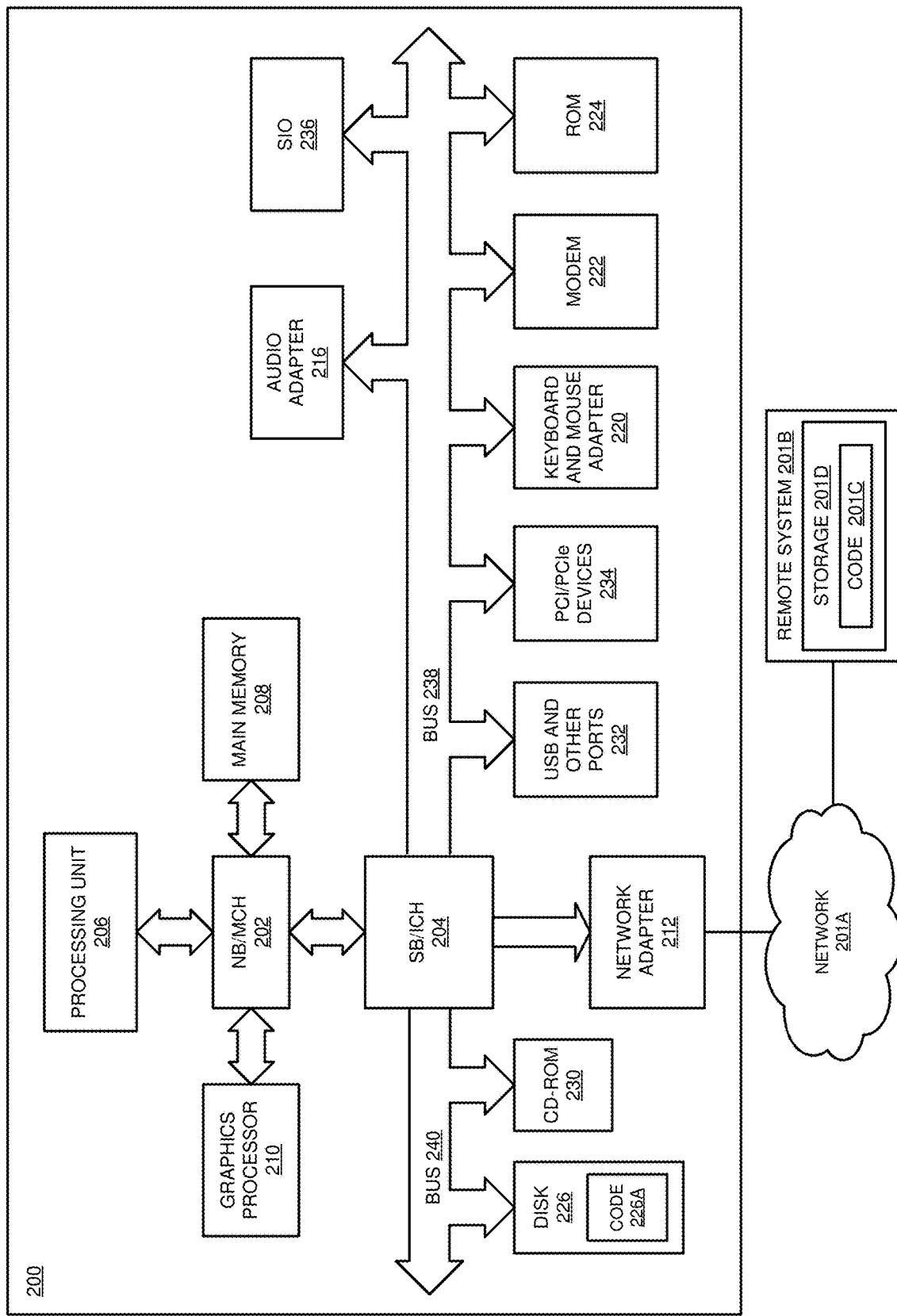
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Classical processing system 104 couples to network 102. Classical processing system 104 is a classical processing system. Software applications may execute on any data processing system in data processing environment 100. Any software application described as executing in classical processing system 104 in FIG. 1 can be configured to execute in another data processing system in a similar manner. Any data or information stored or produced in classical processing system 104 in FIG. 1 can be configured to be stored or produced in another data processing system in a similar manner. A classical data processing system, such as classical processing system 104, may contain data and may have software applications or software tools executing classical computing processes thereon.

Server 106 couples to network 102 along with storage unit 108. Storage unit 108 includes a database 109 configured to store neural network training data as described herein with respect to various embodiments. Server 106 is a conventional data processing system. Processing system 140 couples to network 102. Processing system 140 is a quantum data processing system. Software applications may execute on any quantum data processing system in data processing environment 100. Any software application described as executing in processing system 140 in FIG. 1 can be configured to execute in another quantum data processing system in a similar manner. Any data or information stored or produced in processing system 140 in FIG. 1 can be configured to be stored or produced in another quantum data processing system in a similar manner. A quantum data processing system, such as processing system 140, may contain data and may have software applications or software tools executing quantum computing processes thereon.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several conventional data processing systems, quantum data processing systems, and a data network as shown, whereas another embodiment can be implemented on a single conventional data processing system or single quantum data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, classical processing system 104, processing system 140, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to classical processor 122. Classical processor 122 may include its own data, boot files, operating system images, and applications. Data processing environment 100 may include additional memories, processors, and other devices that are not shown. Memory 124 includes application 105 that may be configured to implement one or more of the classical processor functions described herein for correcting bias on a hybrid classical-quantum computing system in accordance with one or more embodiments.

In the depicted example, memory 144 may provide data, such as boot files, operating system images, and applications to processor 142. Processor 142 may include its own data, boot files, operating system images, and applications. Data processing environment 100 may include additional memories, processors, and other devices that are not shown. Memory 144 includes application 146 that may be configured to implement one or more of the processor functions described herein in accordance with one or more embodiments.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as classical processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
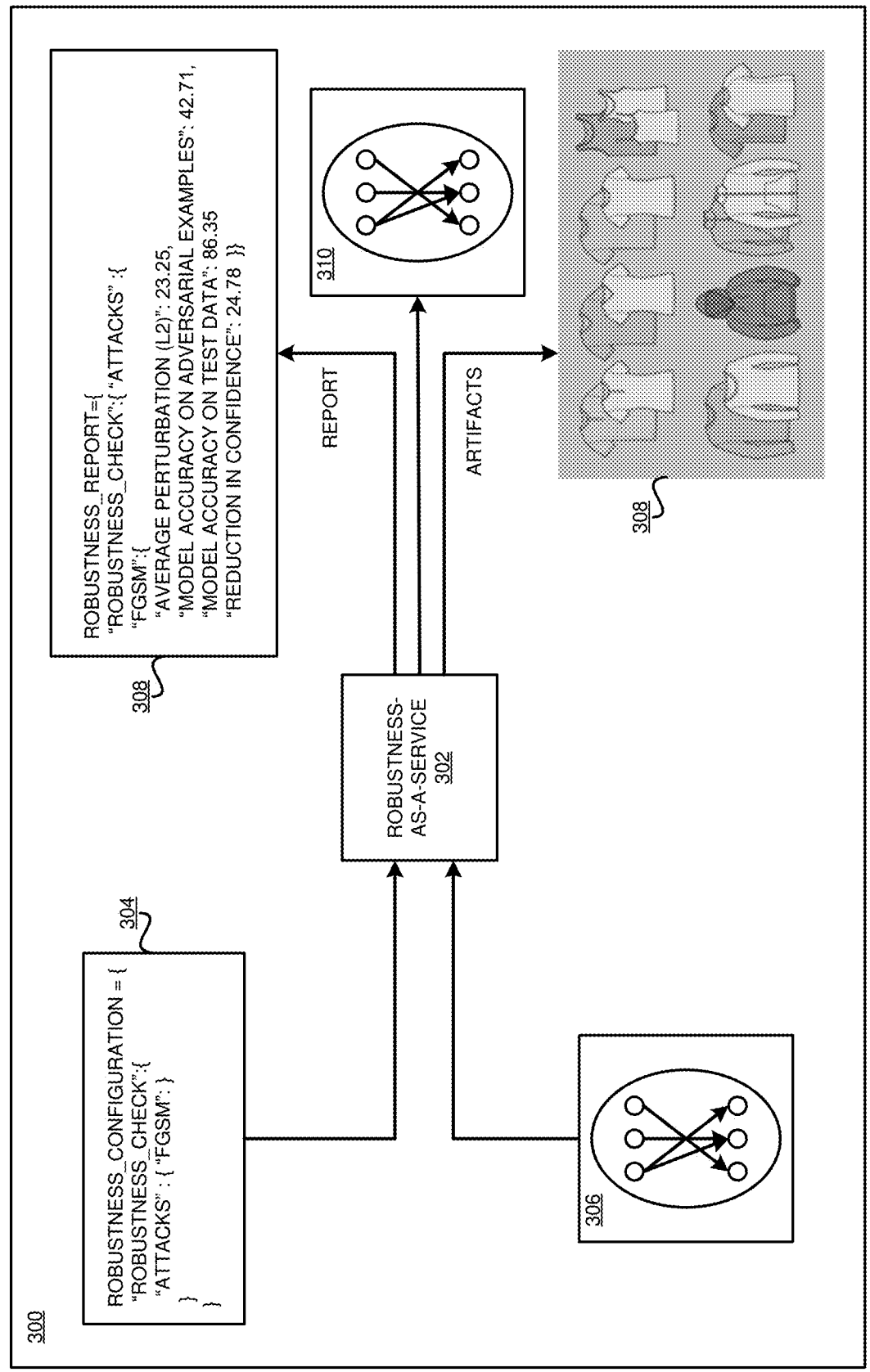
FIG. 3 depicts a block diagram of a model enhancement configuration in accordance with an illustrative embodiment.

With reference to FIG. 3, this figure depicts a block diagram of an example model enhancement configuration 300 in accordance with an illustrative embodiment. The example embodiment includes model enhancement system 302.

Model enhancement system 302 receives a configuration object 304 and a model 306. Model enhancement system 302 enhances the model 306 into an enhanced model 310 according to a strategy that is based on the configuration object 304. The model enhancement system 302 also provides an enhancement report 308 that includes information about the enhancements made in the enhanced model 310 and provides enhancement training data 312 that was used for producing the enhanced model 310. In one example, model enhancement system 302 measures the robustness of the model 306 using a series of adversarial input generation techniques or poison checks to stress test the model 306. In another example, mode enhancement system 302 uses a series of model hardening enhancements to produce enhanced model 310 that is more resistant to adversarial attacks than model 306. In another example, model enhancement system 302 reduces the bias of model 306 using a series of bias checks and debiasing techniques to produce enhanced model 310 that is demonstrably less biased than model 306. In a further example, model enhancement system 302 compresses model 306 using compacting and accelerating techniques to produce enhanced model 310 that is less memory intensive than model 306.

Figure 4:
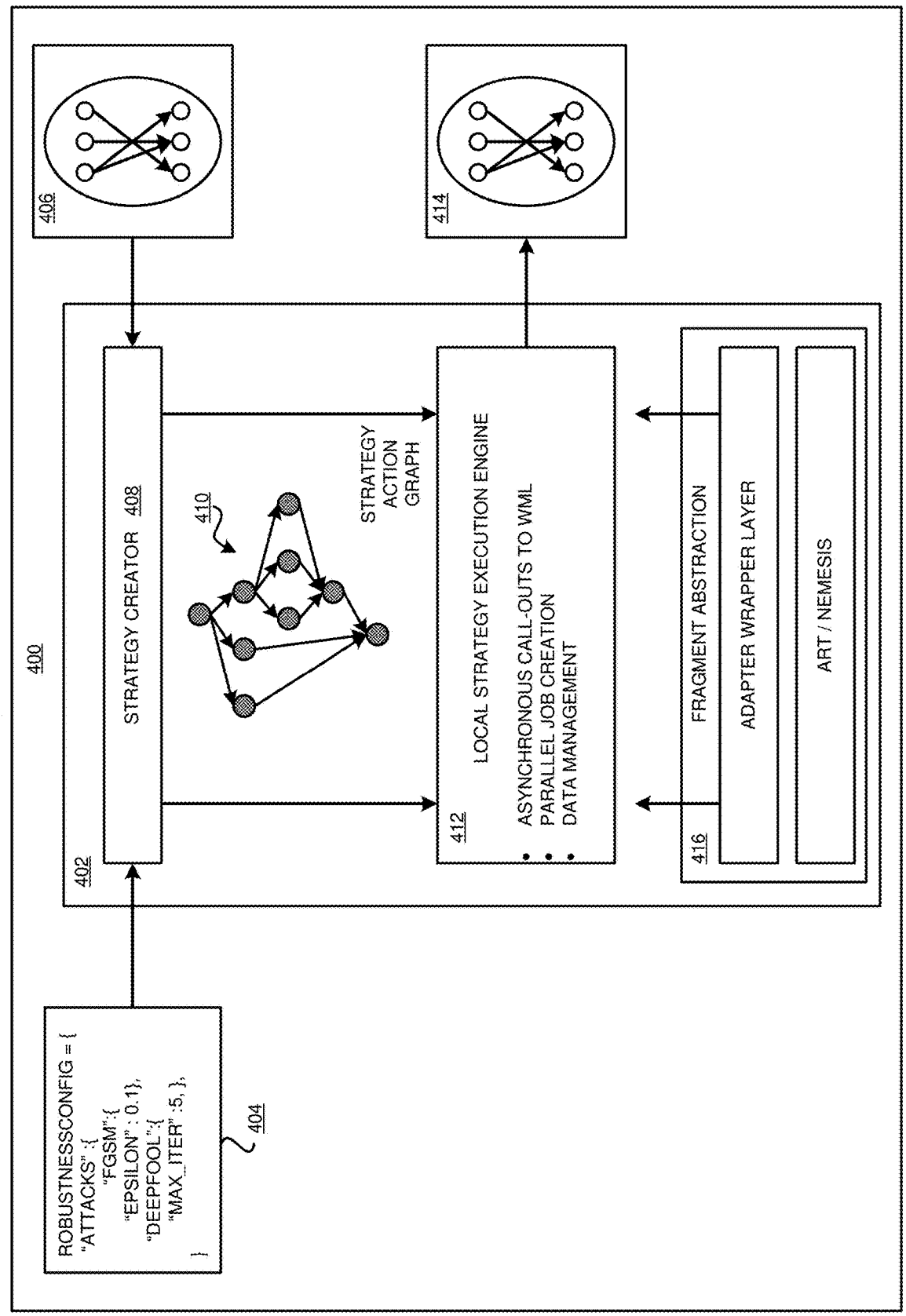
FIG. 4 depicts a block diagram of a model enhancement system in accordance with an illustrative embodiment.

With reference to FIG. 4, this figure depicts a block diagram of an example configuration 400 in accordance with an illustrative embodiment. The example embodiment includes a model enhancement system 402. In a particular embodiment, model enhancement system 402 is an example of model enhancement system 302 of FIG. 3.

Model enhancement system 402 receives a configuration object 404 and a model 406. In an embodiment, model enhancement system 402 includes strategy creation component 408. Strategy creation component 408 processes the configuration object 404 to construct a strategy object 410 based on libraries and algorithms mapped to parameters of the configuration object 404. In one example, strategy creation component 408 constructs a strategy object 410 in the form of an action graph having nodes representative of actions and edges representative of ordering constraints that collectively form a process for enhancing the model 406. In an example, a strategy graph has a single start node and a final leaf node. In some examples, the final leaf node is a generate-report node. In an example, strategy creation component 408 constructs a static strategy object 410. In another example, strategy creation component 408 constructs a dynamic strategy object 410.

In an embodiment, model enhancement system 402 includes strategy execution engine 412. Strategy execution engine 412 processes the strategy object 410 to create an enhanced model 414 by progressively executing the action at each node of the action graph formed in the strategy object 410. The action graph serves as a workflow for the strategy execution engine 412 that includes multiple stages of complex computations on data and data flow. In one example, computations include ingesting data, transforming data, creating optimizers, and/or applying machine learning algorithms. In an example, the strategy execution engine 412 includes a parallel or serialized job execution scheduler (JES) to receive the action graph and schedule the execution of each graph node at a resource. In an example, the strategy execution engine 412 schedules execution of graph nodes at a local resource or can issue callouts for executing the graph nodes at an external execution engine. In an example, the strategy execution engine 412 issues asynchronous callouts to an external resource, for example the IBM Watson Machine Learning (WML) service and stores intermediate action graphs with state information to make the process stateless. In another example, the strategy execution engine 412 outsources execution of the entire action graph to an external workflow execution engine (e.g., Airflow or IBM Cloud Functions Composer).

In an embodiment, model enhancement system 402 includes adapter layer component 416. The adapter layer component 416 allows the model enhancement system 402 to compose and execute complex workflows from high-level user inputs by mapping high-level inputs to pre-built functional building blocks that perform data transformation and machine learning enhancements functions. The adapter layer component 416 accepts libraries of training enhancement algorithms and "plugs" them into the model enhancement system 401 to provide building blocks for strategies. In an example, the adapter layer component 416 includes the Adversarial Robustness Toolkit open source library of building blocks for adversarial robustness enhancement. In an example, the adapter layer component 416 wraps an individual library interface to provide generic building blocks, and further generalizes the wrapped building blocks by adding pre- and post-processing elements to them.

Figure 5:
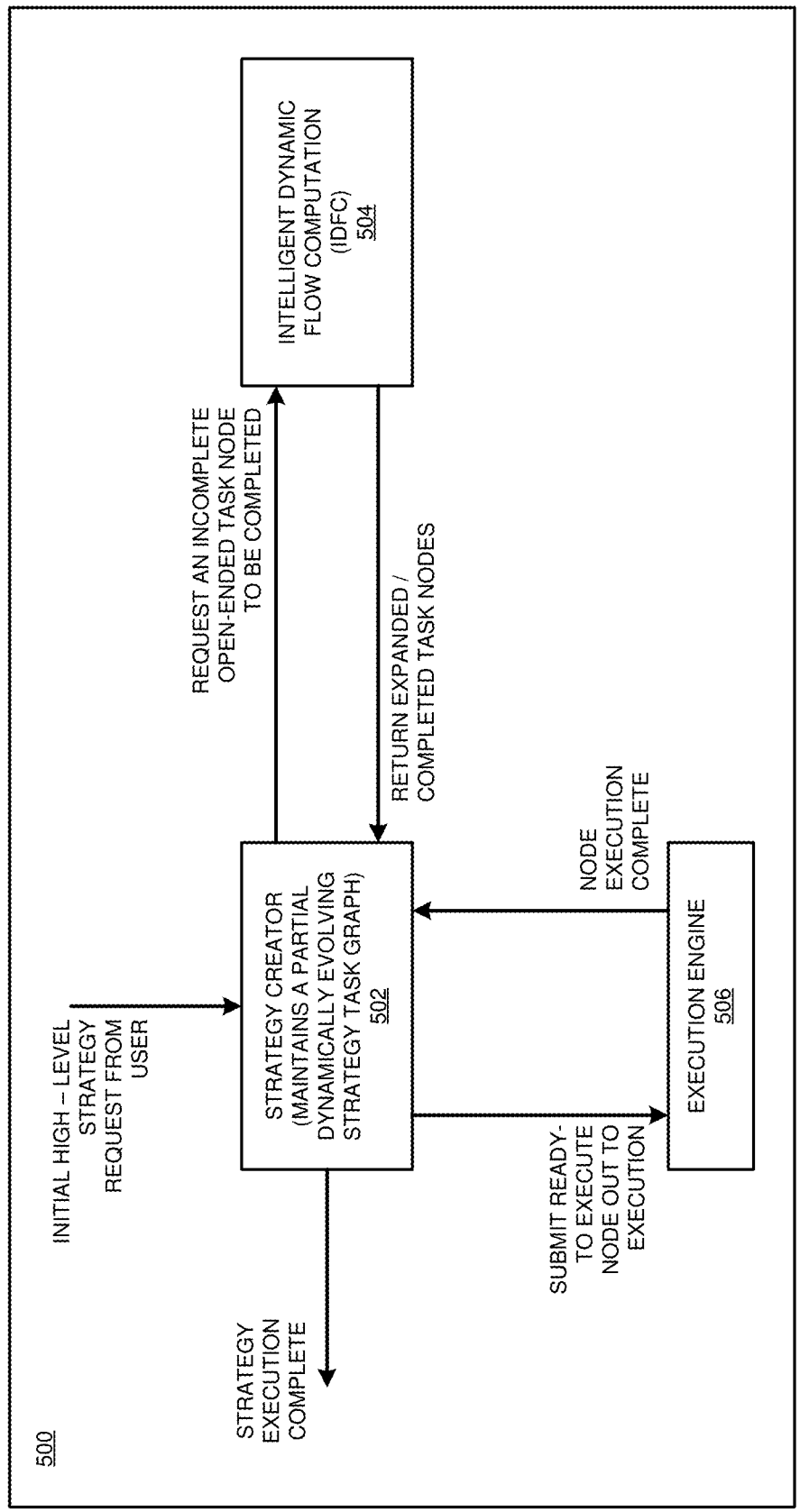
FIG. 5 depicts a block diagram of a dynamic strategy creation configuration in accordance with an illustrative embodiment.

With reference to FIG. 5, this figure depicts a block diagram of an example dynamic strategy creation configuration 500 in accordance with an illustrative embodiment. The example embodiment includes a dynamic strategy creation component 502. In a particular embodiment, dynamic strategy creation component 502 is an example of strategy creation component 408 of FIG. 4.

In an embodiment, dynamic strategy creation configuration 500 includes an intelligent dynamic flow computation (IDFC) component 504 and an execution engine 506 that work in concert with the dynamic strategy creation component 502 to perform a dynamic expansion and execution phase of the overall model enhancement process. The dynamic strategy creation component 502 initiates the dynamic expansion and execution phase Strategy Creator (SC) after receiving an initial high-level strategy request in the form of a configuration object. The dynamic strategy creation component 502 then creates a strategy object in the form of an initial open-ended task execution graph. The dynamic strategy creation component 502 initializes the open-ended task execution graph to include, based on the input strategy in the configuration object, a set of completed (fully specified) notes and a set of special partially completed nodes that act as placeholders for future expanded task nodes. If the current graph includes partially completed root nodes, dynamic strategy creation component 502 sends the graph to IDFC 504 to expand the nodes, passing along links to all execution artifacts that have been generated by the execution of nodes so far. The IDFC 504 expands the nodes using any one of several techniques to create a completely specific task. For example, IDFC 504 expands the using hyper-parameter tuning logic to obtain new parameter settings for the next tuning exploration with which the task node can be fully specified. Examples of hyperparameters include learning rate, training iterations, batch size, and display step. The learning rate defines how fast how the IDFC 504 will update the weights. As another example, the IDFC 504 selects actions after extracting features from the execution history to determine details (e.g., parameter settings) that can complete the task specification in the node. In an example, the IDFC 504 expands the nodes to include the creation of new partially completed nodes that act as placeholders on the graph for future action nodes. In an embodiment, if the dynamic strategy creation component 502 receives a graph that has fully specified root nodes, then the dynamic strategy creation component 502 submits the fully specified nodes to the execution engine 506 for execution and removes them from the graph.

Figure 6A:
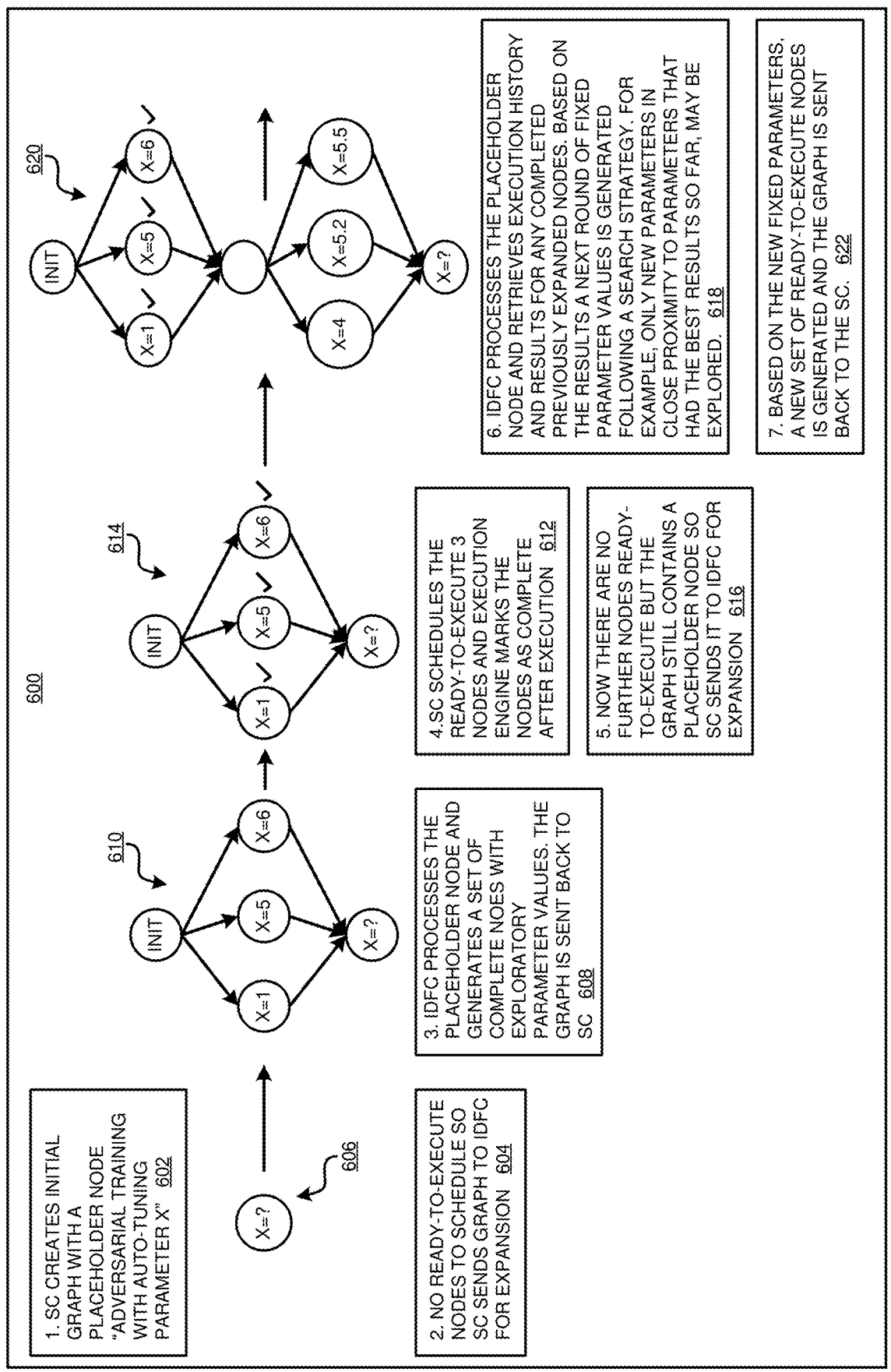
FIGS. 6A-6B depicts a flowchart of an example dynamic expansion and execution phase process for dynamic creation of strategy action nodes in accordance with an illustrative embodiment.
Figure 6B:
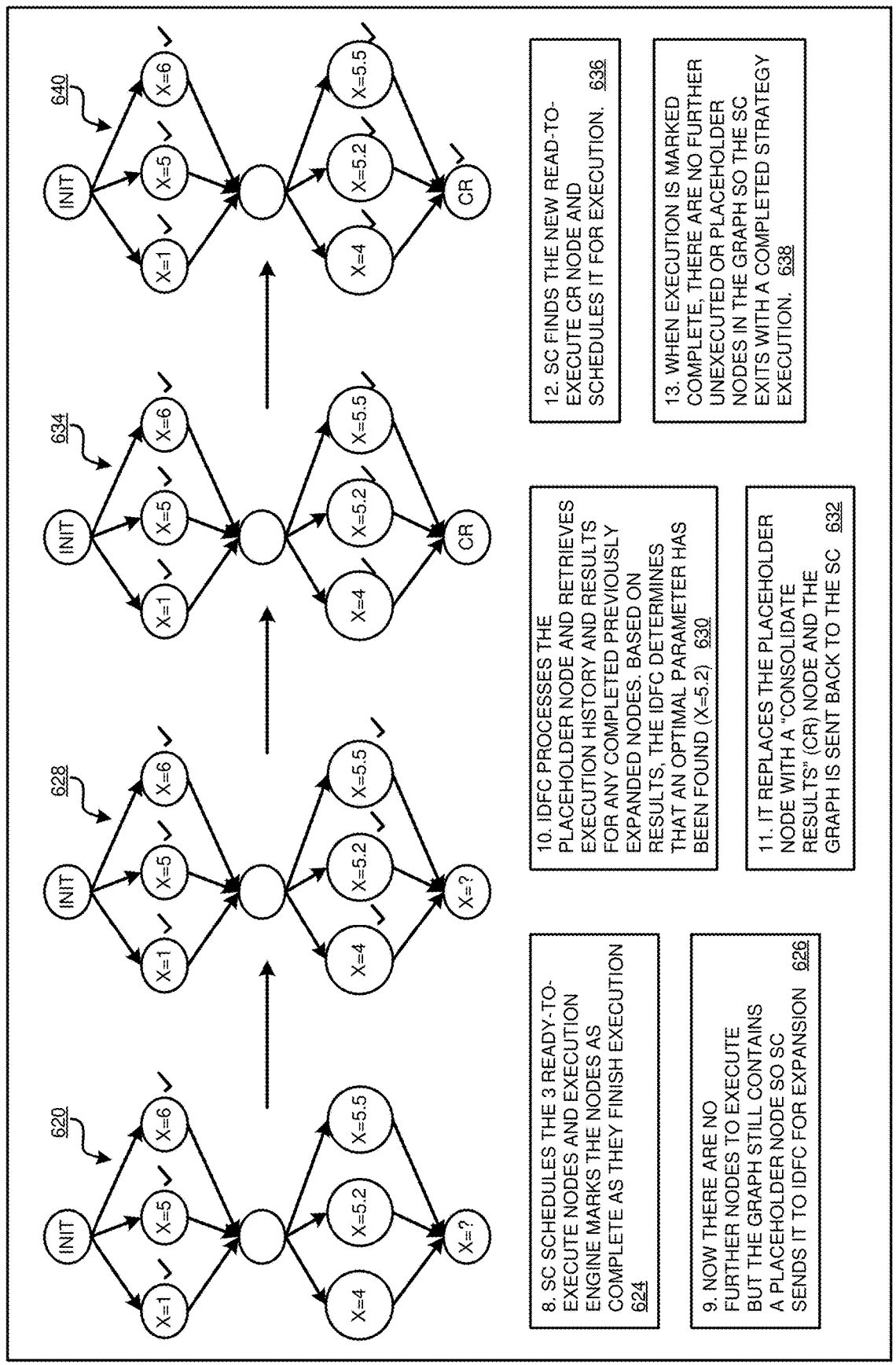

With reference to FIGS. 6A and 6B, these figures depict a flowchart of an example a dynamic expansion and execution phase process 600 in accordance with an illustrative embodiment. In a particular embodiment, dynamic strategy creation configuration 500 carries out the steps of process 600. In an embodiment, at block 602, dynamic strategy creation component 502 creates an initial graph 606 with a placeholder node (designated as X=?) that holds a place for adding a future node. In an embodiment, at block 604, dynamic strategy creation component 502 detects that the graph includes no ready-to-execute nodes to schedule for execution by the execution engine 506, so dynamic strategy creation component 502 sends the graph 606 to IDFC 504 for expansion.

In an embodiment, at block 608, IDFC 504 processes the placeholder node and generates graph 610 having a set of complete nodes with exploratory parameter values, and then sends graph 610 back to dynamic strategy creation component 502.

In an embodiment, at block 612, dynamic strategy creation component 502 schedules the three read-to-execute nodes for execution, and execution engine 506 generates graph 614 by executing the three read-to-execute nodes and marking the three executed nodes as complete. In an embodiment, at block 616, dynamic strategy creation component 502 detects that there are no further ready-to-execute nodes in graph 614, but the graph 614 still contains a placeholder node, so dynamic strategy creation component 502 sends graph 614 to IDFC 504 for expansion.

In an embodiment, at block 618, IDFC 504 processes the placeholder node and retrieves the execution history and results for any previously completed expanded nodes. Based on the results, IDFC 504 generates a next round of fixed parameter values following a search strategy. In an example, IDFC 504 selects only new parameters in close proximity to parameters that had the best results so far. In an embodiment, at block 622, IDFC 504 generates a new set of ready-to-execute nodes, resulting in graph 620, based on the new fixed parameters, and returns graph 620 to the dynamic strategy creation component 502.

In an embodiment, at block 624, dynamic strategy creation component 502 schedules the three read-to-execute nodes for execution, and execution engine 506 generates graph 628 by executing the three read-to-execute nodes and marking the three executed nodes as complete. In an embodiment, at block 626, dynamic strategy creation component 502 detects that there are no further ready-to-execute nodes in graph 628, but the graph 628 still contains a placeholder node, so dynamic strategy creation component 502 sends graph 628 to IDFC 504 for expansion.

In an embodiment, at block 630, IDFC 504 processes the placeholder node in graph 628 and retrieves the execution history and results for any previously completed expanded nodes. Based on the results, IDFC 504 determines that an optimal parameter has been found (X=5.2). In an embodiment, at block 632, IDFC 504 replaces the placeholder node with a "consolidate results" (CR) node, resulting in graph 634, and returns graph 634 to the dynamic strategy creation component 502.

In an embodiment, at block 636, dynamic strategy creation component 502 detects the new read-to-execute (CR) node and schedules it for execution. In an embodiment, at block 638, execution engine 506 generates graph 640 by executing the read-to-execute (CR) node and marking the read-to-execute node as complete. In an embodiment, dynamic strategy creation component 502 detects that dynamic strategy creation component 502 detects that there are no further unexecuted or placeholder nodes in the graph so the dynamic strategy creation component 502 exits with a completed strategy execution.

Figure 7:
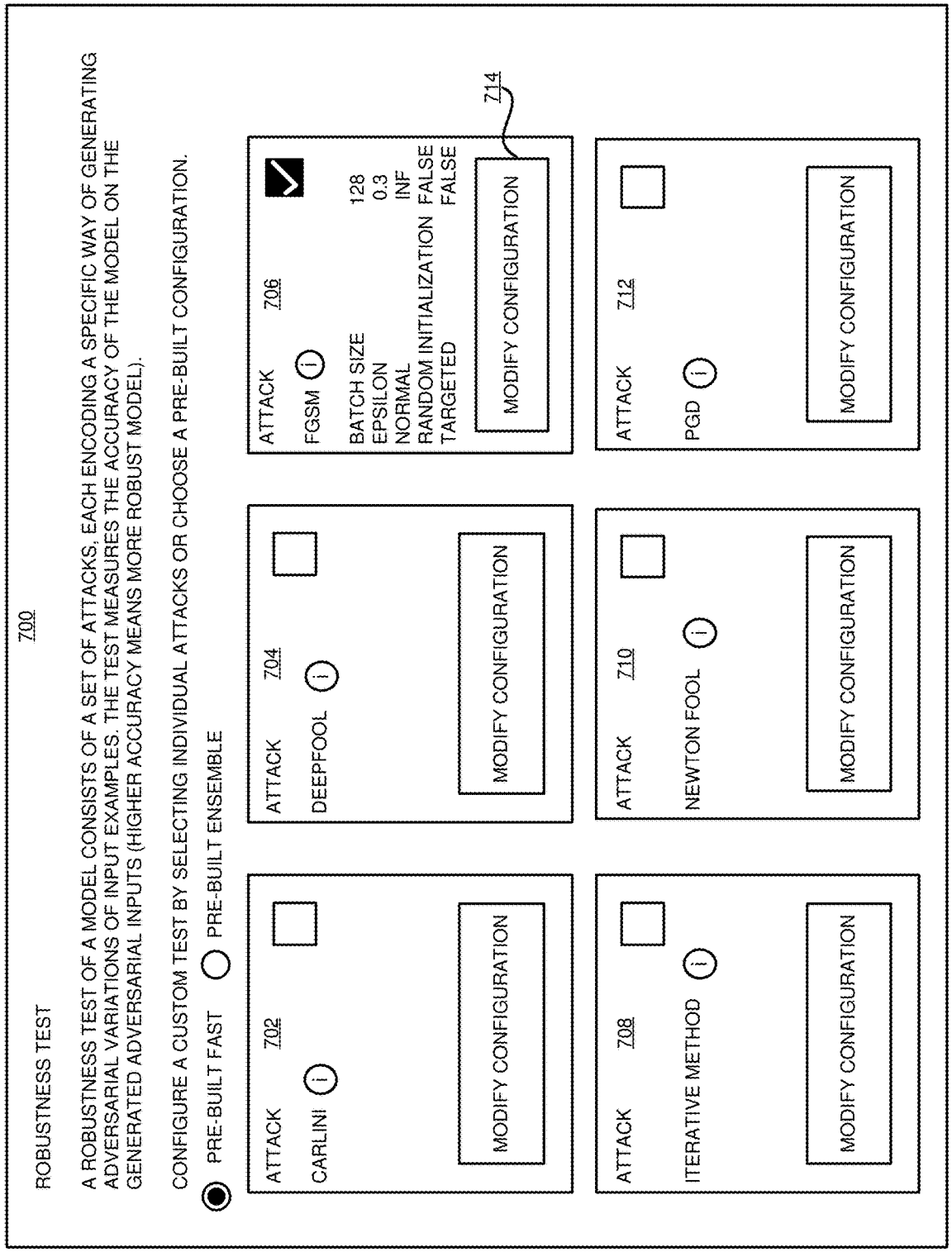
FIG. 7 depicts a user interface for use in allowing a user to specify a high-level strategy that the model enhancement system can interpret as a configuration object in accordance with an illustrative embodiment.

With reference to FIG. 7, this figure depicts a block diagram of an example configuration for a user interface (UI) 700 in accordance with an illustrative embodiment. In a particular embodiment, UI 700 includes user-selectable regions 702-712 that each display a respective high-level description and correspond to respective enhancement strategies. In an example, region 706 corresponds to a Fast gradient sign method (FGSM) and, when selected, displays pre-configured parameter values, thereby providing a simple, high-level selection option that does not require expertise. In an example, the region 706 includes a sub-region 714 that provides a link to another UI that allows a user with more expertise to make adjustments to the configuration rather than use the pre-defined configuration.

Figure 8:
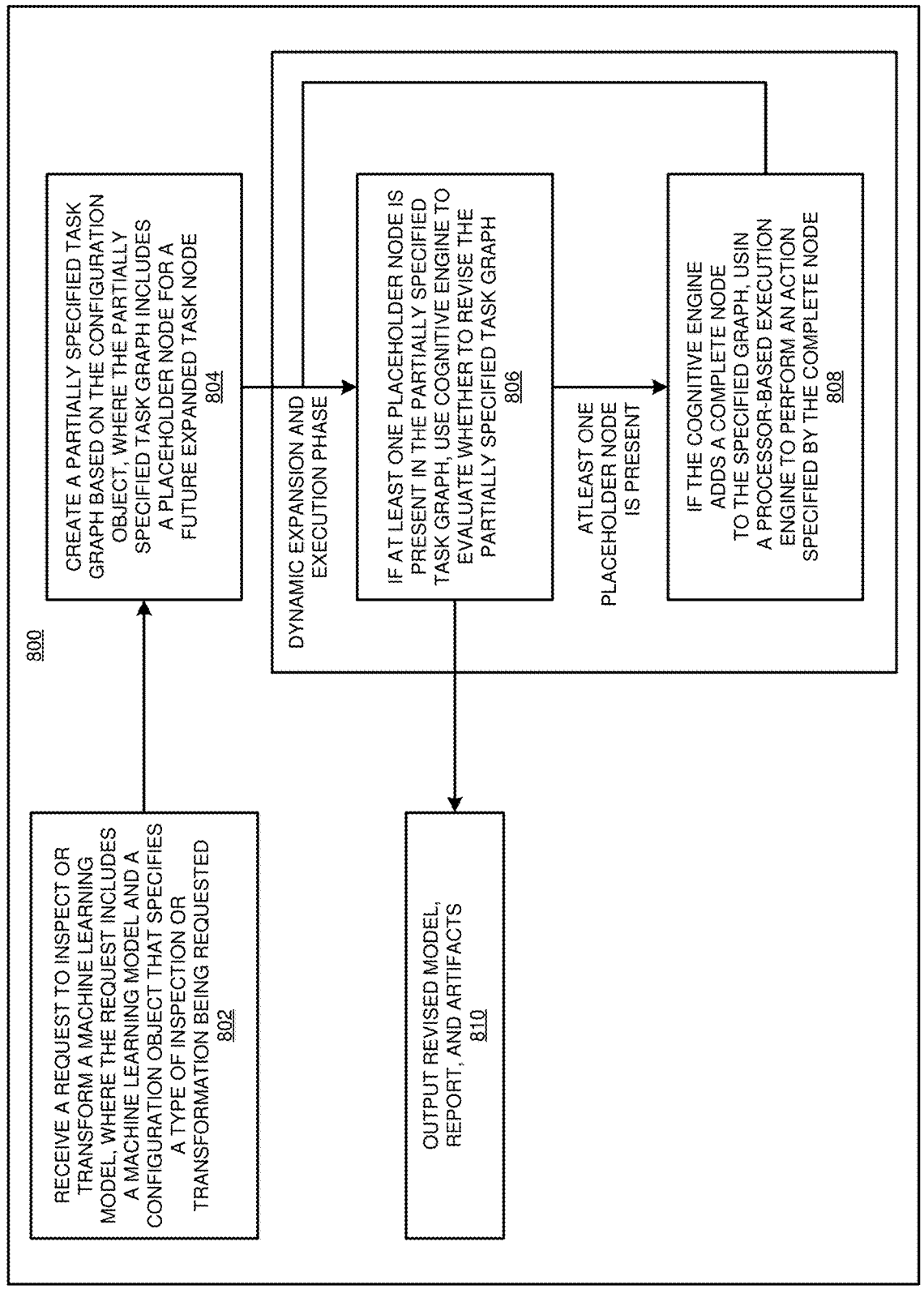
FIG. 8 depicts a flowchart of an example model enhancement process in accordance with an illustrative embodiment.

With reference to FIG. 8, this figure depicts a flowchart of an example process 800 in accordance with an illustrative embodiment. In a particular embodiment, at block 802, model enhancement system 402 receives a request to inspect or transform a machine learning model, where the request includes a machine learning model and a configuration object that specifies a type of inspection or transformation being requested. In an embodiment, at block 804, model enhancement system 402 creates a partially specified task graph based on the configuration object, where the partially specified task graph includes a placeholder node for a future expanded task node.

In an embodiment, at block 806, model enhancement system 402 determines if at least one placeholder node is present in the partially specified task graph, and if so, uses a cognitive engine to evaluate whether to revise the partially specified task graph and proceeds to block 808. In an embodiment, at block 808, model enhancement system 402 determines if the cognitive engine adds a complete node to the specified graph, and if so, uses a processor-based execution engine to perform an action specified by the complete node. In an embodiment, blocks 806 and 808 continue until at block 806 the model enhancement system 402 determines that no further placeholder nodes are present in the graph, meaning that the enhancement process is complete, so the process continues to block 810. In an embodiment, at block 810, the model enhancement system 402 outputs the enhanced model, a report that includes information about the enhancements made in the enhanced model 310 and provides enhancement training data 312 that was used for producing the enhanced model, and artifacts showing information about the training data that was used.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for inspecting and transforming a machine learning model, the computer implemented method comprising:
   receiving, by one or more processors, a request that includes the machine learning model and a configuration object, wherein the configuration object provides an indication of a selected strategy;
   creating, by one or more processors, a partially specified task graph based on the selected strategy, wherein the partially specified task graph is formed of a subset of nodes of a final version of the partially specified task graph, wherein the final version of the partially specified task graph is a final task graph that completes the selected strategy, wherein the partially specified task graph includes a first placeholder node for a future expanded task node; and
   performing, by one or more processors, a dynamic expansion and execution phase that includes, repeatedly:
   if at least one placeholder node is present in the partially specified task graph, using a cognitive engine to evaluate whether to revise the partially specified task graph based at least in part on the selected strategy; and
   if the cognitive engine adds a complete node to the partially specified task graph, using a processor-based execution engine to perform an action specified by the complete node;
   wherein the dynamic expansion and execution phase repeats until after the cognitive engine adds a consolidated results node that completes the final task graph.

2. The computer implemented method of claim 1, further comprising:
   receiving, via a graphical user interface (GUI) generated by one or more processors, user input data indicative of the selected strategy, the selected strategy corresponding to a displayed strategy option; and
   retrieving, from a computer-readable storage device by one or more processors, an algorithm library associated with the selected strategy.

3. The computer implemented method of claim 2, further comprising:
   creating, by one or more processors, the configuration object based at least in part on the selected strategy and the algorithm library associated therewith.

4. The computer implemented method of claim 3, wherein the creating, by the one or more processors, of the partially specified task graph includes initializing the partially specified task graph to include a number of nodes, wherein the number of nodes is based on the algorithm library associated with the selected strategy.

5. The computer implemented method of claim 1, wherein the dynamic expansion and execution phase further comprises storing, by one or more processors in a computer-readable memory, historical data representative of a result of an action previously performed by the execution engine as specified by a previous node of the partially specified task graph.

6. The computer implemented method of claim 5, wherein the cognitive engine evaluates whether to revise the partially specified task graph based at least in part on the historical data and based on the configuration object.

7. The computer implemented method of claim 1, wherein the cognitive engine revises the partially specified task graph based on a revised hyperparameter.

8. The computer implemented method of claim 1, wherein the cognitive engine evaluates how to revise the partially specified task graph by querying a composition planning module to determine a next step in a composition plan for executing the request.

9. The computer implemented method of claim 1, wherein the cognitive engine revises the partially specified task graph according to a selected strategy for improving a robustness of the machine learning model.

10. The computer implemented method of claim 1, wherein the performing of the dynamic and execution phase includes a plurality of iterations of the using of the execution engine to perform respective actions, wherein the respective actions collectively modify the machine learning module and thereby repair model revisions previously made by malicious training data.

11. A computer usable program product for inspecting and transforming a machine learning model, the computer usable program product comprising a computer-readable storage device, and program instructions stored on the storage device, the stored program instructions comprising:
   program instructions to receive, by one or more processors, a request that includes the machine learning model and a configuration object, wherein the configuration object provides an indication of a selected strategy;
   program instructions to create, by one or more processors, a partially specified task graph based on the selected strategy, wherein the partially specified task graph is formed of a subset of nodes of a final version of the partially specified task graph, wherein the final version of the partially specified task graph is a final task graph that completes the selected strategy, wherein the partially specified task graph includes a first placeholder node for a future expanded task node; and
   program instructions to perform, by one or more processors, a dynamic expansion and execution phase that includes, repeatedly:
   if at least one placeholder node is present in the partially specified task graph, using a cognitive engine to evaluate whether to revise the partially specified task graph based at least in part on the selected strategy; and
   if the cognitive engine adds a complete node to the partially specified task graph, using a processor-based execution engine to perform an action specified by the complete node;
   wherein the dynamic expansion and execution phase repeats until after the cognitive engine adds a consolidated results node that completes the final task graph.

12. The computer usable program product of claim 11, further comprising:
   program instructions to receive, via a graphical user interface (GUI) generated by one or more processors, user input data indicative of the selected strategy, the selected strategy corresponding to a displayed strategy option; and
   program instructions to retrieve, from a computer-readable storage device by one or more processors, an algorithm library associated with the selected strategy.

13. The computer implemented method of claim 12, further comprising:
   program instructions to create, by one or more processors, the configuration object based at least in part on the selected strategy and the algorithm library associated therewith.

14. The computer implemented method of claim 13, wherein the creating, by the one or more processors, of the partially specified task graph includes initializing the partially specified task graph to include a number of nodes, wherein the number of nodes is based on the algorithm library associated with the selected strategy.

15. The computer implemented method of claim 11, wherein the dynamic expansion and execution phase further comprises storing, by one or more processors in a computer-readable memory, historical data representative of a result of an action previously performed by the execution engine as specified by a previous node of the partially specified task graph.

16. A computer system comprising a processor, a computer-readable memory, and a computer-readable storage device, and program instructions stored on the storage device for execution by the processor via the memory, the stored program instructions comprising:
   program instructions to receive, by one or more processors, a request that includes the machine learning model and a configuration object, wherein the configuration object provides an indication of a selected strategy;
   program instructions to create, by one or more processors, a partially specified task graph based on the selected strategy, wherein the partially specified task graph is formed of a subset of nodes of a final version of the partially specified task graph, wherein the final version of the partially specified task graph is a final task graph that completes the selected strategy, wherein the partially specified task graph includes a first placeholder node for a future expanded task node; and
   program instructions to perform, by one or more processors, a dynamic expansion and execution phase that includes, repeatedly:
   if at least one placeholder node is present in the partially specified task graph, using a cognitive engine to evaluate whether to revise the partially specified task graph based at least in part on the selected strategy; and
   if the cognitive engine adds a complete node to the partially specified task graph, using a processor-based execution engine to perform an action specified by the complete node;
   wherein the dynamic expansion and execution phase repeats until after the cognitive engine adds a consolidated results node that completes the final task graph.

17. The computer implemented method of claim 16, further comprising:
   program instructions to receive, via a graphical user interface (GUI) generated by one or more processors, user input data indicative of the selected strategy, the selected strategy corresponding to a displayed strategy option;
   program instructions to retrieve, from a computer-readable storage device by one or more processors, an algorithm library associated with the selected strategy; and
   program instructions to create, by one or more processors, the configuration object based at least in part on the selected strategy and the algorithm library associated therewith.

18. The computer implemented method of claim 17, wherein the creating, by the one or more processors, of the partially specified task graph includes initializing the partially specified task graph to include a number of nodes, wherein the number of nodes is based on the algorithm library associated with the selected strategy.

19. The computer implemented method of claim 16, wherein the dynamic expansion and execution phase further comprises storing, by one or more processors in a computer-readable memory, historical data representative of a result of an action previously performed by the execution engine as specified by a previous node of the partially specified task graph.

20. The computer implemented method of claim 19, wherein the cognitive engine evaluates whether to revise the partially specified task graph based at least in part on the historical data and based on the configuration object.

* * * * *